United States Patent
Yamada

(10) Patent No.: US 8,050,837 B2
(45) Date of Patent: Nov. 1, 2011

(54) MOBILE UNIT AND CONTROL METHOD OF MOBILE UNIT

(75) Inventor: Koji Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 680 days.

(21) Appl. No.: 12/223,585

(22) PCT Filed: Aug. 28, 2007

(86) PCT No.: PCT/JP2007/067113
§ 371 (c)(1),
(2), (4) Date: Aug. 4, 2008

(87) PCT Pub. No.: WO2008/029751
PCT Pub. Date: Mar. 13, 2008

(65) Prior Publication Data
US 2009/0018743 A1    Jan. 15, 2009

(30) Foreign Application Priority Data
Sep. 4, 2006 (JP) .................................. 2006-238515

(51) Int. Cl.
*G05D 1/08* (2006.01)
(52) U.S. Cl. .......................................... 701/70; 180/210
(58) Field of Classification Search .................... 701/70, 701/93; 180/210
See application file for complete search history.

(56) References Cited

U.S. PATENT DOCUMENTS

| | | | | |
|---|---|---|---|---|
| 7,363,993 B2 * | 4/2008 | Ishii | ................................ | 180/7.1 |
| 7,703,568 B2 * | 4/2010 | Ishii | ................................ | 180/218 |
| 7,823,676 B2 * | 11/2010 | Yamada et al. | ................ | 180/218 |
| 2010/0030441 A1 * | 2/2010 | Kosaka | ............................ | 701/70 |
| 2010/0219011 A1 * | 9/2010 | Shimoyama et al. | ......... | 180/218 |
| 2011/0071714 A1 * | 3/2011 | Takenaka | ........................ | 701/22 |
| 2011/0071752 A1 * | 3/2011 | Takenaka et al. | .............. | 701/124 |
| 2011/0098884 A1 * | 4/2011 | Doi | ................................ | 701/36 |

FOREIGN PATENT DOCUMENTS

| | | |
|---|---|---|
| JP | 04-201793 A | 7/1992 |
| JP | 11-500331 A | 1/1999 |
| JP | 2000-233661 A | 8/2000 |
| JP | 2003-331884 A | 11/2003 |
| JP | 2004-295430 A | 10/2004 |
| JP | 2005-094898 A | 4/2005 |
| JP | 2005-138630 A | 6/2005 |

* cited by examiner

Primary Examiner — Kevin Hurley
(74) Attorney, Agent, or Firm — Kenyon & Kenyon LLP

(57) ABSTRACT

In an inverted pendulum type mobile unit that performs inverted pendulum stabilization control and traveling control based on a velocity target value as an input variable, a change in tilt angle of a vehicle body occurring during traveling is smoothed. The target value generating portion in the inverted pendulum type mobile unit generates the velocity target value $V_{REF}$ of the mobile unit and the tilt angular rate target value $\omega_{REF}$ of the vehicle body so that a second-order time derivative of $V_{REF}$ is continuous and $\omega_{REF}$ is continuous with respect to time. The controller in the inverted pendulum type mobile unit calculates a torque command value $T_{com}$ for the motor drivers using $V_{REF}$ and $\omega_{REF}$ as a control target to allow the mobile unit to travel at $V_{REF}$ while maintaining the state where the gravity center of the vehicle body or the gravity center of total mass of the vehicle body and a subject supported on the vehicle body is located above the rotation center of the wheels.

10 Claims, 7 Drawing Sheets

MOBILE UNIT AND CONTROL METHOD OF MOBILE UNIT

This is a 371 national phase application of PCT/JP2007/067113 filed 28 Aug. 2007, which claims priority of Japanese Patent Application No. 2006-238515 filed 04 Sep. 2006, the contents of which are incorporated herein by reference.

TECHNICAL FIELD

The present invention relates to an inverted pendulum type mobile unit and, particularly, to an inverted pendulum type mobile unit which performs inverted pendulum stabilization control and traveling control toward a velocity which is designated by a user or the like as a control target value.

BACKGROUND ART

An inverted pendulum type mobile unit in this description includes a vehicle body and a rotator with a circular cross section (such as a wheel) which is coupled to the vehicle body in such a way that the vehicle body can tilt in the longitudinal direction of the mobile unit and is capable of moving by the rotation of the rotator while maintaining the state where the center of gravity of the vehicle body or the center of gravity of the total mass of the vehicle and a subject such as a user that is supported on the vehicle body is located above the rotation center of the rotator.

There have been proposals for a control method of an inverted pendulum type mobile unit. In an inverted pendulum type mobile unit of a related art, it is typical to detect a tilt angle of a vehicle body with respect to the vertical by a tilt angle sensor which is placed in the mobile unit and perform inverted pendulum stabilization control and traveling control using the detected tilt angle as an input variable. The inverted pendulum type mobile unit which employs such a control method is disclosed in the patent document 1.

The inverted pendulum type mobile unit which is disclosed in the patent document 1 includes wheels that are attached at the left and right sides of a vehicle body and two motors that respectively drive the left and right wheels independently. The inverted pendulum type mobile unit which is disclosed in the patent document 1 further includes a tilt angle sensor (specifically, an acceleration sensor) that detects a tilt angle of the vehicle body in the longitudinal direction of the mobile unit, a tilt angular rate sensor (specifically, a rate gyro) that detects a tilt angular rate, and a controlling portion that performs the inverted pendulum stabilization control for maintaining the inverted position of the vehicle body and the traveling control in the longitudinal direction using the tilt angle and the tilt angular rate which are detected by the tilt angle sensor and the tilt angular rate sensor as input variables.

In the inverted pendulum type mobile unit which is disclosed in the patent document 1, the forward and backward traveling of the mobile unit is controlled according to the tilt of the vehicle body by the shift in the center of gravity of a user. In the inverted pendulum type mobile unit which travels by a user's control of the tilt angle of the vehicle body, an acceleration of the mobile unit is determined as a result of performing the control loop for maintaining a dynamically balanced inverted state, and a velocity is determined as a result of the traveling of the mobile unit with the determined acceleration. Since the controlled variable which is designated by a user is the tilt angle of the vehicle body, the mobile unit is likely to behave in a way that is not intended by the user. Because the above-described handling of the inverted pendulum type mobile unit by the tilt angle of the vehicle body differs significantly from the handling of a passenger car, which controls the velocity of the mobile unit by the adjustment of accelerator opening made by a driver, the above-described way of controlling the mobile unit is generally difficult.

On the other hand, an inverted pendulum type mobile unit which performs the inverted pendulum stabilization control and the traveling control toward a velocity target value which is input by a user or the like, rather than the tilt angle of a vehicle body, as an input variable is also proposed (cf. e.g. the patent documents 2 and 3).

The patent document 2 discloses the inverted pendulum type mobile unit which has a joystick for inputting a fictitious signal that is deemed to be a tilt parameter that includes at least one of a tilt angle or a tilt angular rate of a vehicle body and controls the forward and backward traveling of the mobile unit according to the manipulation of the joystick by a user. The patent document 2 describes a tilt angle target value and a translational velocity target value of a vehicle body as specific parameters which are associated with a fictitious signal that is generated according to the degree of manipulation of the joystick.

In the inverted pendulum type mobile unit which is disclosed in the patent document 2, when the degree of manipulation of the joystick is associated with a velocity target value such as a translational velocity of the mobile unit or a rotation angular velocity of wheels, the mobile unit can travel forward and backward at the velocity target value which is input by the manipulation of the joystick by performing the combination of the traveling control which generates a torque command value to a motor so as to generate a translational velocity or a rotation angular velocity of wheels which is equal to the velocity target value according to the velocity target value which is given by the joystick manipulation and the inverted pendulum stabilization control which generates a torque command value so as to maintain the inverted position of the vehicle body using a tilt angle and a tilt angular rate of the vehicle body as input variables.

The inverted pendulum type mobile unit which is disclosed in the patent document 3 detects at least one of a tilt angle and a tilt angular rate of a vehicle body and performs the inverted pendulum stabilization control of the inverted pendulum type mobile unit using the detected one or both of tilt angle and tilt angular rate as an input value. Specifically, the inverted pendulum type mobile unit which is disclosed in the patent document 3 includes a gyro sensor that detects a tilt angular rate and performs the inverted pendulum stabilization control so as to bring the tilt angular rate that is detected by the gyro sensor to zero. Further, the inverted pendulum type mobile unit which is disclosed in the patent document 3 is capable of inputting a velocity target value of the mobile unit and it performs the traveling control so that the velocity of the mobile unit becomes the input velocity target value in addition to the above-described inverted pendulum stabilization control.

[Patent document 1] Japanese Unexamined Patent Application Publication No. 2005-94898
[Patent document 2] Japanese Unexamined Patent Application Publication No. 4-201793
[Patent document 3] Japanese Unexamined Patent Application Publication No. 2004-295430

DISCLOSURE OF THE INVENTION

Problems to be Solved by the Invention

As described in the foregoing, the inverted pendulum type mobile units which are disclosed in the patent documents 2 and 3 use the velocity target value that is associated with the manipulation of the joystick by a user or the velocity target value that is prestored in a memory for automatic driving as an input variable and perform control so that the current velocity of the mobile unit which is detected by an encoder or the like becomes the velocity target value. However, if the inverted pendulum type mobile unit is controlled using the velocity target value as an input variable, an abrupt change in tilt angle occurs in response to a change in the velocity target value in order to maintain the inverted position of the vehicle body, which hinders the smooth movement of the mobile unit to make a user uncomfortable.

The present invention has been accomplished to solve the above issues and an object of the present invention is thus to smooth a change in the tilt angle of a vehicle body which occurs during traveling in an inverted pendulum type mobile unit that performs inverted pendulum stabilization control and traveling control based on a velocity target value as an input variable.

Means for Solving the Problems

According to a first embodiment of the present invention, there is provided a mobile unit that includes at least one rotator with a circular cross section and a vehicle body supported by the rotator, in which the vehicle body is capable of oscillating at least in a longitudinal direction of the mobile unit during traveling of the mobile unit. The mobile unit includes a driving portion, a target value generating portion and a controlling portion. The driving portion drives the rotator. The target value generating portion generates a velocity target value of the mobile unit and a tilt angular rate target value of the vehicle body in such a way that a second-order time derivative of the velocity target value is continuous and the tilt angular rate target value is continuous with respect to time. The controlling portion calculates a control command value for the driving portion using the velocity target value and the tilt angular rate target value as a control target so as to allow the mobile unit to travel at the velocity target value while maintaining a state where a center of gravity of the vehicle body or a center of gravity of a total mass of the vehicle body and a subject to be supported on the vehicle body is located above a rotation center of the rotator.

In this configuration, the mobile body according to the first embodiment of the present invention uses a tilt angular rate target value that is continuous with respect to time, in addition to a velocity target value, as a control target, and it is thereby possible to suppress a discontinuous change in tilt angular rate, that is, an abrupt change in tilt angular rate in a short time. The mobile body according to the first embodiment of the present invention can thereby smooth a change in the tilt angle of the vehicle body which occurs during traveling while being an inverted pendulum type mobile unit that is controlled based on a velocity target value.

In the mobile unit according to the first embodiment of the present invention, the tilt angular rate target value is preferably calculated by multiplying a second-order time derivative of the velocity target value by a predetermined gain.

The mobile unit according to the first embodiment of the present invention may further include a manipulated variable generating portion to accept a manipulation input by a user and output a manipulated variable signal corresponding to a degree of manipulation by a user, and the target value generating portion may generate the velocity target value and the tilt angular rate target value based on the manipulated variable signal. Further, the target value generating portion may use a correction signal obtained by correcting the manipulated variable signal in such a way that a second-order time derivative becomes continuous as the velocity target value.

In the mobile unit according to the first embodiment of the present invention, the target value generating portion may generate a second-order time derivative of the manipulated variable signal in such a way that the second-order derivative is continuous with respect to time, and output the tilt angular rate target value by multiplying the generated second-order derivative by a predetermined gain. It is thereby possible to easily obtain a tilt angular rate target value that is continuous with respect to time. Further, the target value generating portion may output the velocity target value by performing second-order integration of the second-order derivative. It is thereby possible to easily obtain a velocity target value of which a second-order time derivative is continuous.

In the mobile unit according to the first embodiment of the present invention, when the target value generating portion outputs the velocity target value and the tilt angular rate target value which are generated based on the same signal, it is preferred to output the velocity target value to the controlling portion with a delay behind the tilt angular rate target value. In this configuration, it is possible to efficiently generate the tilt angle of the vehicle body which is necessary upon generating the translational acceleration and the velocity in the mobile unit.

In the mobile unit according to the first embodiment of the present invention, the target value generating portion preferably generates the velocity target value in such a way that a third-order time derivative is continuous and generates the tilt angular rate target value in such a way that a first-order derivative with respect to time is possible. In this configuration, it is possible to assure the continuity of a tilt angular acceleration that is a time derivative of a tilt angular rate, thereby enabling smooth acceleration and deceleration when tilting the vehicle body. It is thereby possible to further smooth the tilt motion of the vehicle body.

According to a second embodiment of the present invention, there is provided a control method of an inverted pendulum type mobile unit including at least one rotator with a circular cross section and a vehicle body supported by the rotator. Specifically, the method first generates a velocity target value of the mobile unit and a tilt angular rate target value of the vehicle body in such a way that a second-order time derivative of the velocity target value is continuous and the tilt angular rate target value is continuous with respect to time. It then performs control loop that calculates a control command value for the driving portion using the velocity target value and the tilt angular rate target value as a control target so as to allow the mobile unit to travel at the velocity target value while maintaining a state where a center of gravity of the vehicle body or a center of gravity of a total mass of the vehicle body and a subject to be supported on the vehicle body is located above a rotation center of the rotator.

The control method of the mobile unit according to the second embodiment of the present invention controls the traveling of the mobile unit using a tilt angular rate target value that is continuous with respect to time, in addition to a velocity target value, as a control target, and it is thereby possible to suppress a discontinuous change in tilt angular rate, that is, an abrupt change in tilt angular rate in a short time. The method can thereby smooth a change in the tilt angle of the vehicle body which occurs during traveling while being an inverted pendulum type mobile unit that is controlled based on a velocity target value.

Advantageous Effects of the Invention

The present invention can smooth a change in the tilt angle of a vehicle body which occurs during traveling in an inverted pendulum type mobile unit that performs inverted pendulum stabilization control and traveling control based on a velocity target value as an input variable.

DESCRIPTION OF REFERENCE SYMBOLS

Figure 1A:
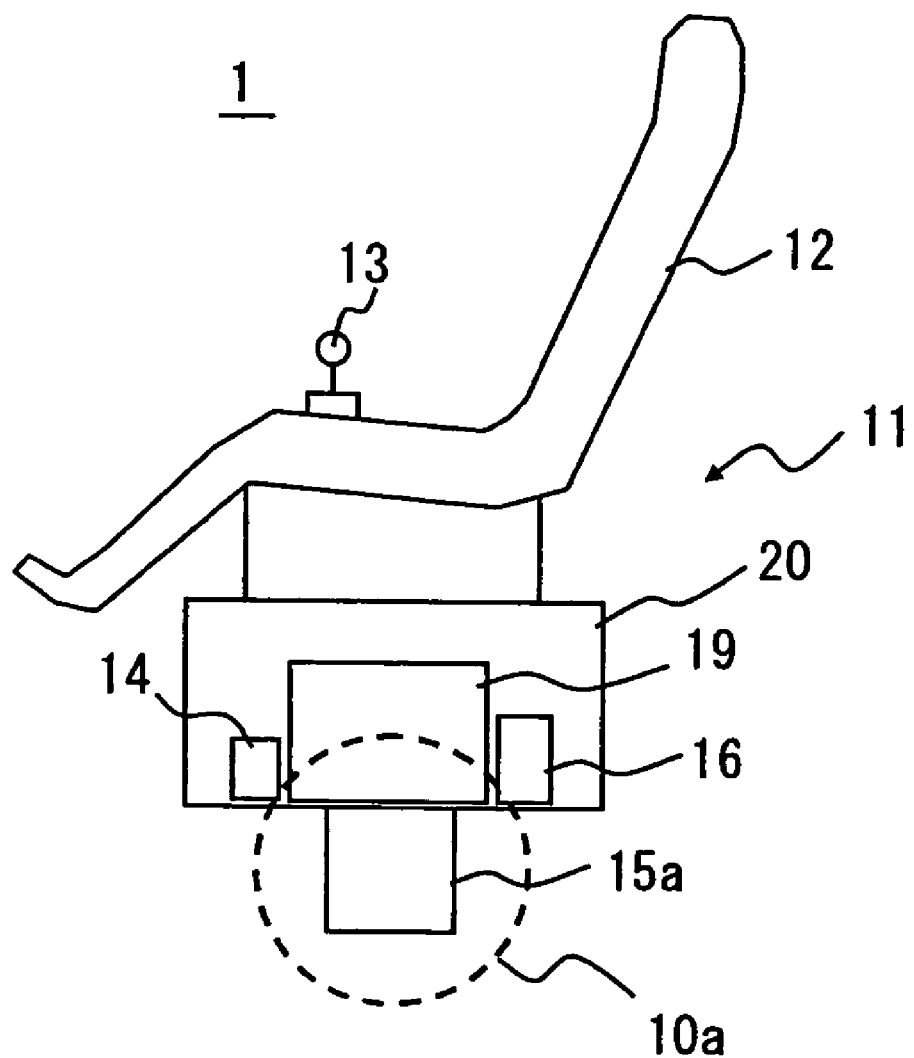
FIG. 1A An external view of an inverted pendulum type mobile unit according to an embodiment of the present invention.

1 Mobile unit
10a, 10b Wheel
11 Vehicle body
12 Seat
13 Control stick
14 Computer
15a, 15b Motor
16a, 16b Motor driver
17a, 17b Encoder
18 Rate gyro
19 Battery
20 Case
100 Target value generating portion
101 Jerk generating portion
102 second-order integrator
103 Multiplier
104 Controlled variable calculating portion
105, 106 Adder
107 Stabilization/traveling controller
301 Axle
302 Link
202 Adder
203, 204 Integrator
201, 205, 206 Multiplier Best Modes for carrying out the Invention Detailed embodiments of the present invention will be described hereinafter in detail with reference to the drawings. In each drawing, the same element is denoted by the same reference symbols, and redundant description will be omitted for clarifying the description.

First Embodiment

Figure 1B:
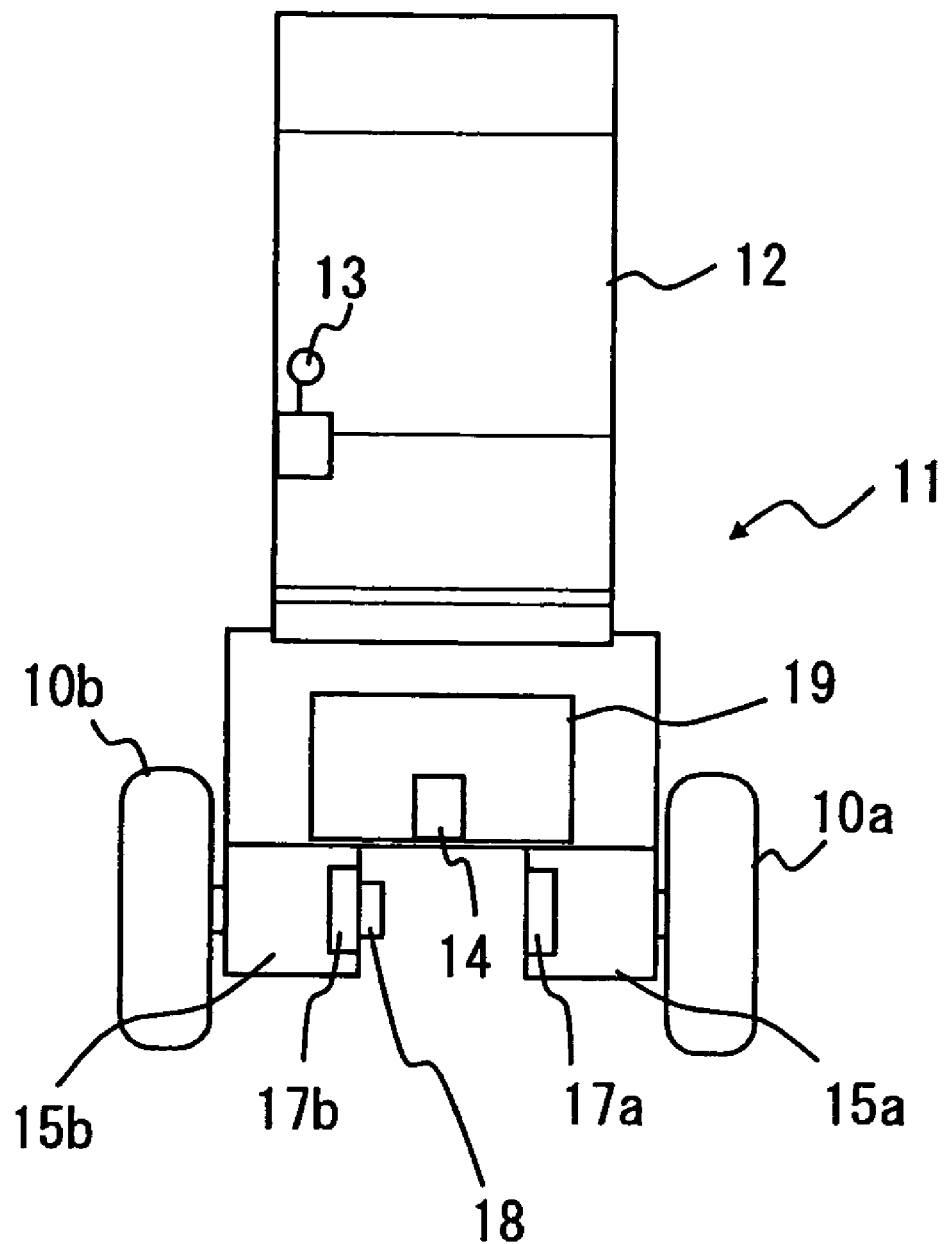
FIG. 1B An external view of an inverted pendulum type mobile unit according to an embodiment of the present invention.

An inverted pendulum type mobile unit 1 according to an embodiment is a vehicle which is capable of traveling according to the manipulation by a user. The external view of the inverted pendulum type mobile unit 1 (which is referred to hereinafter simply as the mobile unit 1) according to the embodiment is shown in FIG. 1A and FIG. 1B. FIG. 1A is a side view of the mobile unit 1, and FIG. 1B is a front view of the mobile unit 1.

As shown in FIG. 1A and FIG. 1B, left and right wheels 10a and 10b are placed in the lower part of the mobile unit 1. The wheels 10a and 10b are disposed on the same rotation axis, and a vehicle body 11 can tilt in the longitudinal direction of the mobile unit 1 which is orthogonal to the rotation axis. The vehicle body 11 includes a seat 12, a control stick 13, a computer 14, a motor 15, a motor driver 16, an encoder 17, a rate gyro 18, a battery 19 and a case 20.

The control stick 13 accepts a manipulation input by a user who is seated on the seat 12 and outputs a manipulated variable signal according to the degree of manipulation of the control stick 13 by the user. In this embodiment, the manipulated variable signal is proportional to the velocity target value of the mobile unit 1, and the translational velocity of the mobile unit 1 which is intended by a user is input through the control stick 13.

The computer 14 executes control in such a way that the mobile unit 1 can travel at a velocity target value $V_{REF}$ while maintaining the inverted position of the vehicle body 11. Specifically, the computer 14 calculates a velocity target value $V_{REF}$ of the mobile unit 1 which is associated with the degree of manipulation of the control stick 13 and a target value of a rate of change in tilt angle from the vertical in the vehicle body 11 (which is referred to hereinafter as a tilt angular rate target value $\omega_{REF}$) and executes inverted pendulum stabilization control and traveling control using the velocity target value $V_{REF}$ and the tilt angular rate target value $\omega_{REF}$ as input variables and a translational velocity $V_N$ of the mobile body 1 and a tilt angular rate $\omega_N$ of the vehicle body 11 as controlled variables. The detail of the control is described later.

The motors 15a and 15b are coupled to the wheels 10a and 10b, respectively. Motor drivers 16a and 16b drive the motors 15a and 15b, respectively, according to a torque command value $\tau_{COM}$ which is output from the computer 14. The mobile unit 1 travels forward and backward when the wheels 10a and 10b are driven by the motors 15a and 15b.

The encoders 17a and 17b are sensors for measuring a rotation angle Θ of the motors 15a and 15b, respectively. A rotation angular velocity of the wheels 10a and 10b is obtained by calculating a rotation angle per unit time of the wheels 10a and 10b using the output of the encoders 17a and 17b. Further, the translational velocity $V_N$ of the mobile body 1 is obtained by calculating the product of the rotation angular velocity of the wheels 10a and 10b and the length of radius of the wheels 10a and 10b. Thus, the encoders 17a and 17b are sensors for obtaining the current translational velocity $V_N$ of the mobile body 1. On the other hand, the rate gyro 18 is a tilt angular rate sensor for detecting the current tilt angular rate $\omega_N$ of the vehicle body 11.

Figure 2:
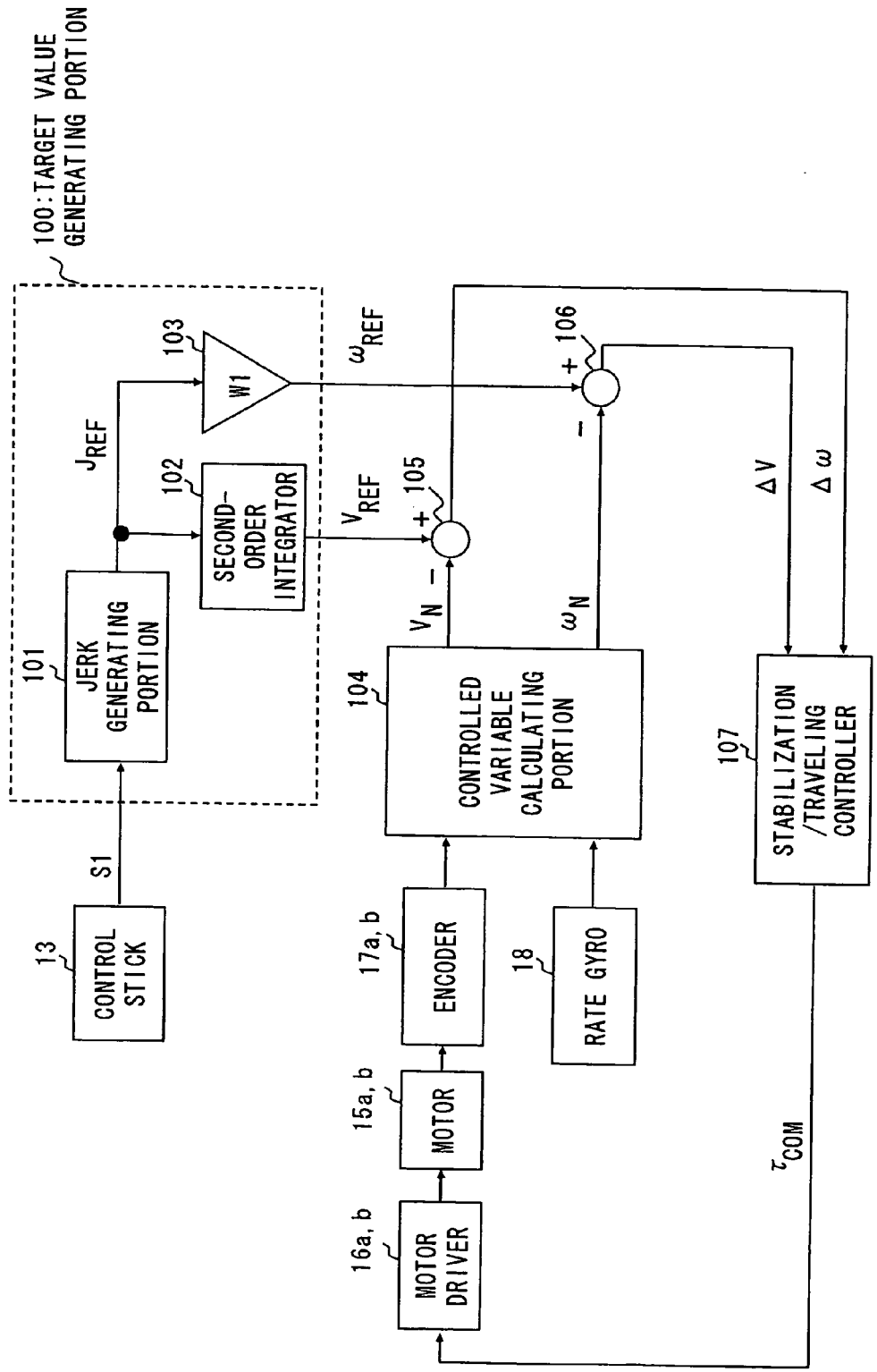
FIG. 2 An overall view of a control system of an inverted pendulum type mobile unit according to an embodiment of the present invention.

A control system of the mobile body 1 according to the embodiment is described hereinafter. FIG. 2 shows the overall configuration of the control system of the mobile body 1. In FIG. 2, a target value generating portion 100 receives a manipulated variable signal which is output from the control stick 13 and calculates the velocity target value $V_{REF}$ of the mobile unit 1 and the tilt angular rate target value $\omega_{REF}$ of the vehicle body 11.

A jerk generating portion 101 receives a manipulated variable signal which is output from the control stick 13 and calculates a continuous jerk target value $J_{REF}$ for the mobile unit 1 based on the received signal. The jerk target value $J_{REF}$ is a time derivative of acceleration in the translational direction of the mobile unit 1. Thus, even when a second-order time derivative of a manipulated variable signal which is output from the control stick 13 is discontinuous, a continuous jerk target value $J_{REF}$ is generated by the jerk generating portion 101. Specifically, a jerk target value $J_{REF}$ can be generated by inputting a manipulated variable signal into a third-order lag filter. Because a delay time is long in such a configuration, a nonlinear function may be used.

A second-order integrator 102 performs second-order time integration of the continuous jerk target value $J_{REF}$, thereby generating the velocity target value $V_{REF}$ of which a second-order derivative with respect to time is continuous.

A multiplier 103 multiplies the jerk target value $J_{REF}$ by a gain W1, thereby generating the tilt angular rate target value $\omega_{REF}$ of the vehicle body 11. The gain W1 to be multiplied with the jerk target value $J_{REF}$ is theoretically 1/g, where g is a gravitational acceleration.

The definition of terms "continuous" and "derivable" which are used in this description is additionally explained below. In mathematics, a function f(x) is continuous at a certain point a when the limit of the function f(x) at the point a is f(a). On the other hand, when the left limit and the right limit of the function f(x) at the point a is different, the function f(x) is discontinuous at the point a. Further, the function f(x) is derivable at a certain point a when both of a left differential coefficient and a right differential coefficient exist in the vicinity of the point a and the two coefficients are equal.

Although the jerk target value $J_{REF}$, the velocity target value $V_{REF}$ and the tilt angular rate target value $\omega_{REF}$, which are to be processed by the target value generating portion 100 and a stabilization/traveling controller 107 described later, are the function of time, they are digital signals which have a function value that is only significant to a discrete sampling point. Therefore, the mathematically strict concept of the "continuous" and "derivable" cannot be applied to the jerk target value $J_{REF}$, the velocity target value $V_{REF}$ and the tilt angular rate target value $\omega_{REF}$. Accordingly, in this description, when the function of time f(t) is given as a digital signal, f(t) is defined to be "continuous" at a certain sampling point a if a difference between a function value at the sampling point a and a function value at a sampling point adjacent to the sampling point a is within a predetermined threshold range.

Further, in this description, when the function of time f(t) is given as a digital signal, f(t) is defined to be "derivable" at a certain sampling point a if a difference between a left differential coefficient and a right differential coefficient which are calculated by difference approximation in the vicinity of the sampling point a is within a predetermined threshold range.

Figure 3:
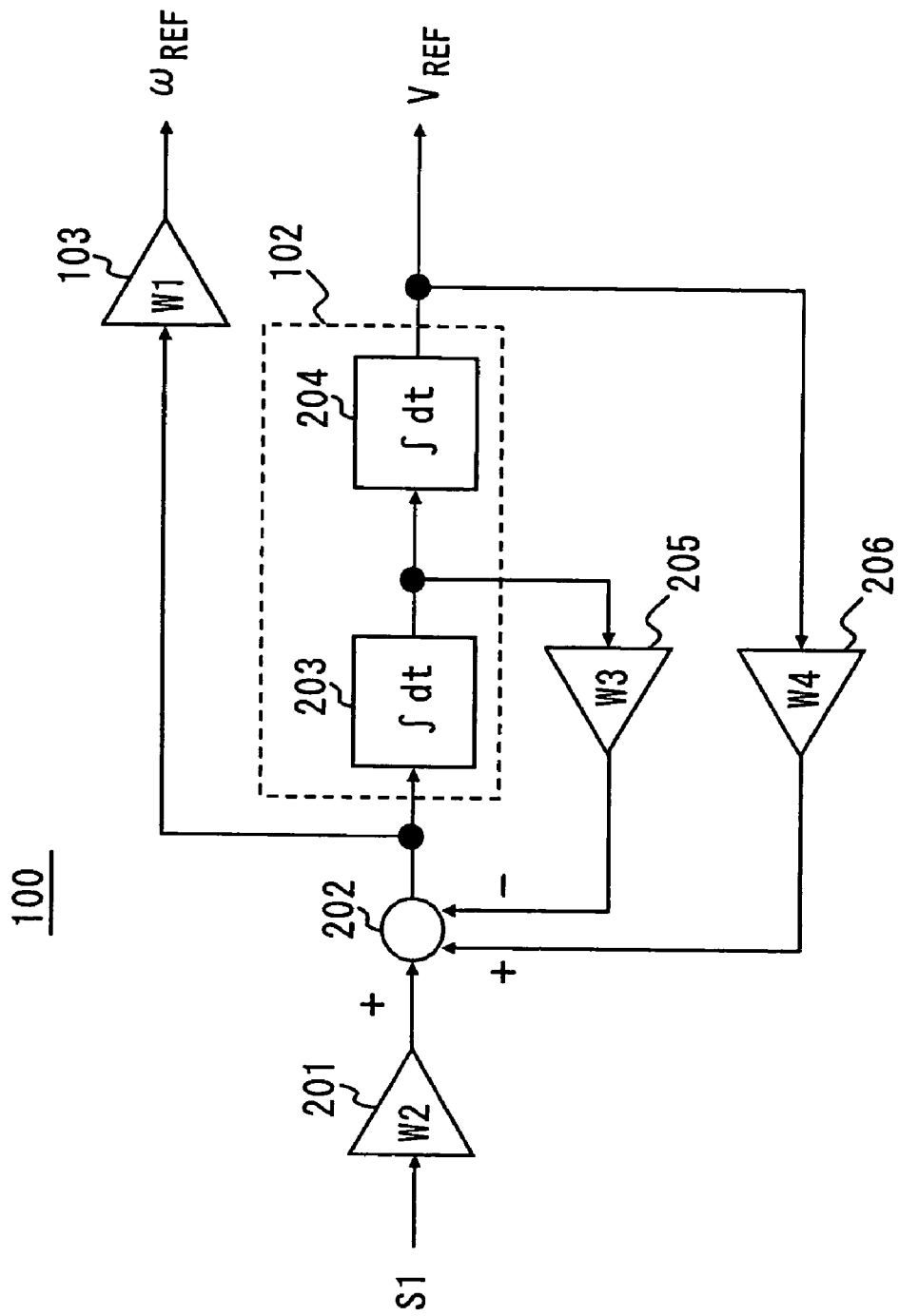
FIG. 3 A view showing an exemplary configuration of a target value generating portion which is included in an inverted pendulum type mobile unit according to an embodiment of the present invention.

FIG. 3 shows an example of a specific configuration of the target value generating portion 100. In FIG. 3, multipliers 201, 205 and 206 give a gain corresponding to a sampling rate to an input signal. An adder 202 calculates the jerk target value $J_{REF}$ based on output signals from the multipliers 201, 205 and 206. Integrators 203 and 204 respectively perform first-order integration.

Referring back to FIG. 2, a controlled variable calculating portion 104 receives the rotation angle Θ of the motors 15a and 15b which are measured by the encoders 17a and 17b, respectively, and calculates the translational velocity $V_N$ of the mobile body 1, which is a controlled variable in the control system shown in FIG. 2. Further, the controlled variable calculating portion 104 performs A/D conversion of the tilt angular rate of the vehicle body 11 which is measured by the rate gyro 18 and generates the tilt angular rate $\omega_N$, which is a digital quantity.

An adder 105 calculates a deviation ΔV between the velocity target value $V_{REF}$ and the current translational velocity $V_N$. An adder 106 calculates a deviation Δω between the tilt angular rate target value $\omega_{REF}$ and the current tilt angular rate $\omega_N$.

The stabilization/traveling controller 107 receives the control deviations ΔV and Δω and calculates a torque command value $\tau_{COM}$ to the motor drivers 16a and 16b so as to bring the control deviations ΔV and Δω closer to zero.

It is noted that FIG. 2 showing the configuration of the control system describes only the elements which are necessary for the inverted pendulum stabilization control and the traveling control in the longitudinal direction of the mobile unit 1 in order to simplify the description. Thus, it is matter of course that, besides the elements shown in FIG. 2, a controller or a sensor for controlling the position, posture or the like of the mobile unit is added to the mobile unit 1 according to need.

The processing in the controlled variable calculating portion 104 and the stabilization/traveling controller 107 described above may be implemented by using the computer 14. Specifically, a program for causing the computer 14 to perform the processing shown in FIG. 4 may be executed in accordance with a timer interrupt which occurs at regular time intervals.

Figure 4:
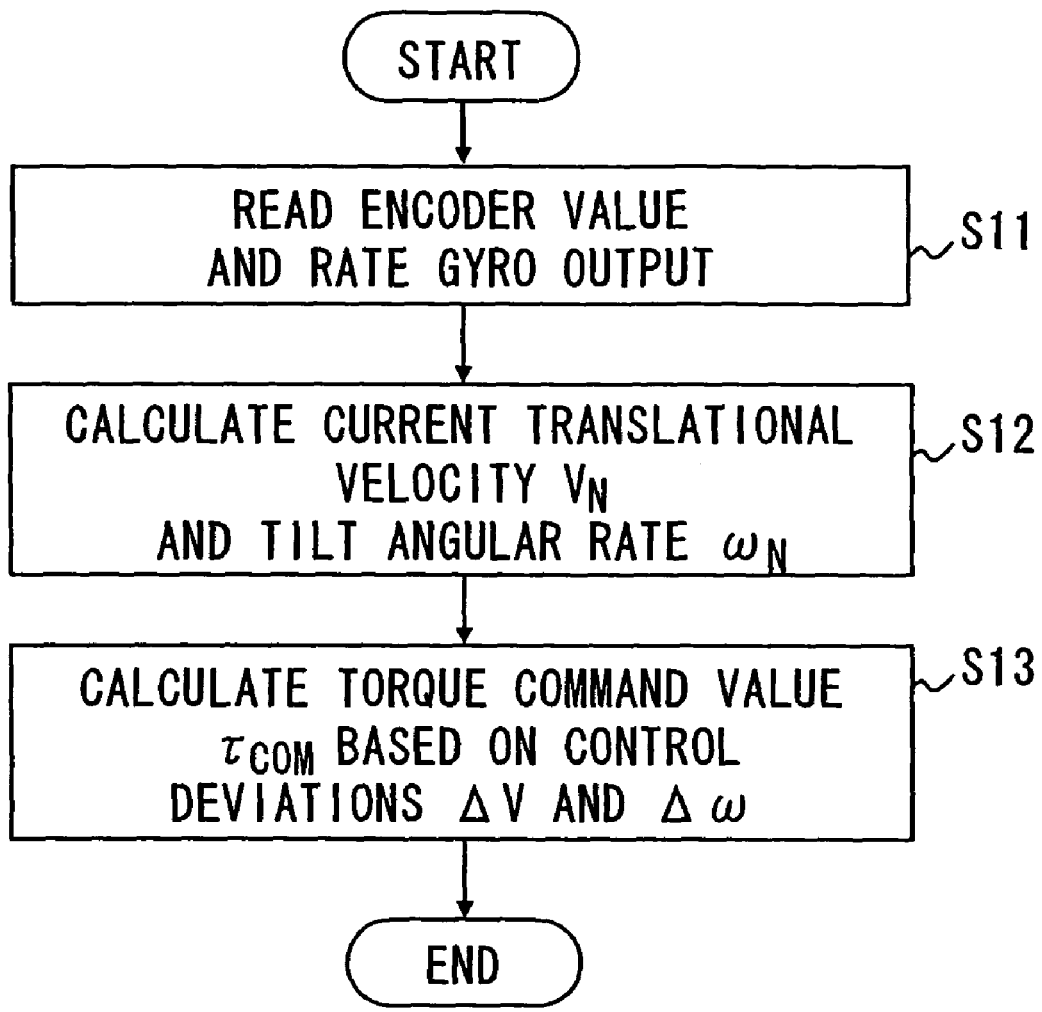
FIG. 4 A flowchart showing the processing that is executed by a computer which is included in an inverted pendulum type mobile unit according to an embodiment of the present invention.

The step S11 in the flowchart of FIG. 4 inputs encoder values which are measured by the encoders 17a and 17b (specifically, the rotation angle Θ of the wheels 10a and 10b) and an output signal of the rate gyro 18. The step S12 calculates the current translational velocity $V_N$ and tilt angular rate $\omega_N$ based on the encoder values and the output of the rate gyro 18. The step S13 calculates a torque command value $\tau_{COM}$ so that both of the control deviation ΔV between the velocity target value $V_{REF}$ which is output from the target value generating portion 100 and the current translational velocity $V_N$ and the control deviation Δω between the tilt angular rate target value $\omega_{REF}$ and the current tilt angular rate $\omega_N$ become closer to zero.

The relationship between the jerk target value $J_{REF}$ in the translational direction and the tilt angular rate target value $\omega_{REF}$ is additionally described hereinafter with reference to FIG. 5 in order to facilitate the understanding of the configuration of the target value generating portion 100 described above.

Figure 5:
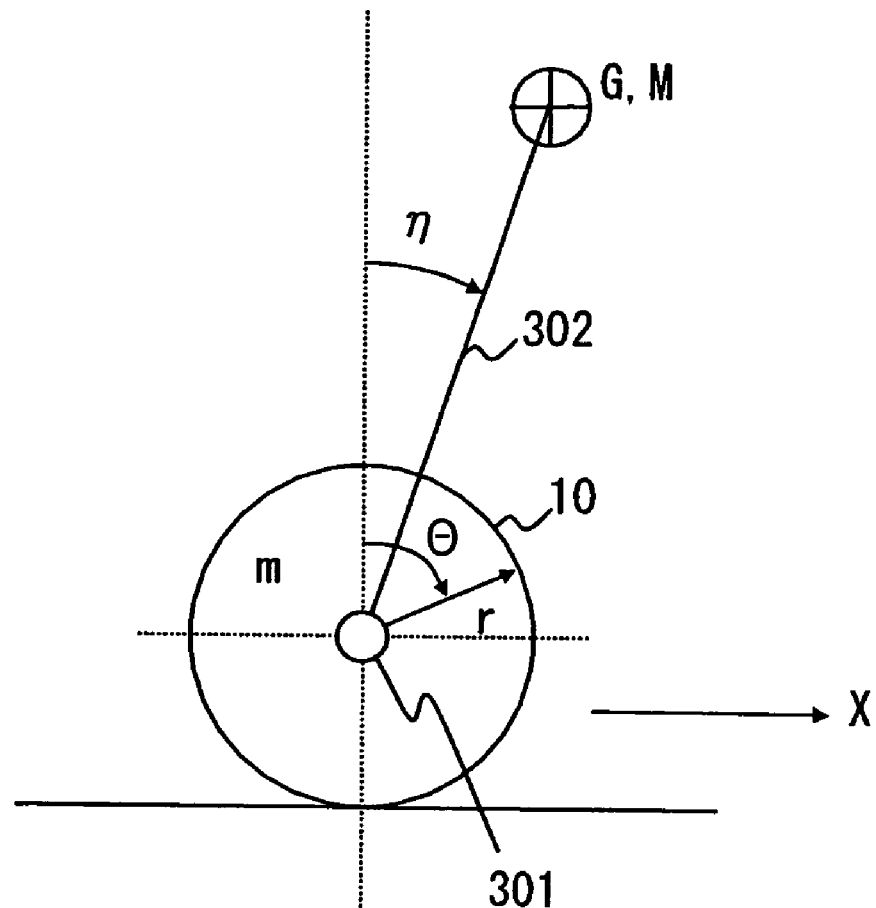
FIG. 5 A model view of an inverted pendulum type mobile unit according to an embodiment of the present invention.

FIG. 5 is a model of the inverted pendulum type mobile unit which corresponds to the mobile unit 1. In FIG. 5, X indicates a displacement in the translational direction of the mobile unit 1. m indicates the mass of the wheels 10a and 10b. r indicates the radius of the wheels 10a and 10b. Θ indicates the rotation angle of the wheels 10a and 10b. G indicates the center of gravity of a total mass M including the vehicle body 11, a user and other loads. η indicates the tilt angle of the center of gravity G from the vertical. An axle 301 is an axle of the wheels 10a and 10b. A link 302 is a link which connects between the axle 301 and the center of gravity G.

In the model of FIG. 5, a velocity $V_{GX}$ of the center of gravity G in the translational direction during the translational acceleration of the mobile unit 1 and an acceleration $A_{GX}$ that is a time derivative thereof are represented by the following expressions 1 and 2. The dot above the variable in the following expressions indicates a time derivative.

$$V_{GX} = \dot{X} + \dot{\eta}\cos\eta \quad \text{[Expression 1]}$$

$$A_{GX} = \frac{d}{dt}V_{GX} \quad \text{[Expression 2]}$$
$$= \ddot{X} + \ddot{\eta}\cos\eta - (\dot{\eta})^2\sin\eta$$

Further, because a tangent of the translational acceleration $A_{GX}$ of the center of gravity G and the gravitational acceleration g is the tilt angle η, the tilt angle η can be represented by the following expression 3.

$$\eta = \arctan\left(\frac{A_{GX}}{g}\right) \quad \text{[Expression 3]}$$

If the tilt angular rate ω (dη/dt) is calculated by a time derivative of the expression 3, the calculation is complex. Thus, if it is assumed that η is sufficiently small, the tilt angular rate ω is sufficiently smaller than the translational velocity $V_{GX}$ of the center of gravity G, and a tilt angular acceleration that is a time derivative of the tilt angular rate ω is sufficiently smaller than the translational acceleration $A_{GX}$ of the center of gravity G, the tilt angle η and the tilt angular rate ω can be approximately represented by the expressions 4 and 5.

$$\eta \cong \frac{A_{GX}}{g} \quad \text{[Expression 4]}$$

$$\omega = \frac{d}{dt}\eta \quad \text{[Expression 5]}$$
$$\cong \frac{1}{g}\frac{d}{dt}A_{GX}$$
$$= \frac{J_{GX}}{g}$$

Thus, the tilt angular rate ω is a value that is obtained by dividing a jerk $J_{GX}$ of the center of gravity G in the translational direction by the gravitational acceleration g. Accordingly, the target value generating portion 100 shown in FIG. 2 generates the tilt angular rate target value $\omega_{REF}$ by multiplying a jerk target value $J_{REF}$ by a predetermined gain.

As described in the foregoing, the mobile unit 1 of this embodiment has the control stick 13 as a manipulated variable generating portion that is manipulated by a user and it generates the velocity target value $V_{REF}$ of which a second-order time derivative is continuous and the tilt angular rate target value $\omega_{REF}$ which is continuous with respect to time based on the degree of manipulation of the control stick 13. Thus, the mobile unit 1 does not directly use a velocity signal (which is referred to hereinafter as a directed velocity) which is proportional to the degree of manipulation of the control stick 13 that is input by a user as the velocity target value $V_{REF}$, but uses a velocity signal which is corrected so that a second-order time derivative is continuous as the velocity target value $V_{REF}$. Then, it performs feedback control toward the velocity target value $V_{REF}$ and the tilt angular rate target value $\omega_{REF}$ which are generated in the above-described manner as a control target.

An inverted pendulum type mobile unit of a related art which performs the inverted pendulum stabilization control and the traveling control using a velocity target value as an input variable has an issue that the second-order derivability of a velocity target value which is input by a user or the like is not assured. More specifically, in the case where the degree of manipulation of a control stick such as a joystick is associated with a velocity target value, for example, because the manipulation of the control stick by a user is continuous with respect to time, the continuity of the velocity target value with respect to time and the first-order derivability are assured. However, the second-order derivability of a velocity command value and the continuity of a second-order derivative are not assured. Therefore, the tilt angular rate of a vehicle body which is proportional to a second-order derivative of a velocity target value can change discontinuously. The discontinuous change, i.e. abrupt change with time, in the tilt angular rate causes unsmooth movement of a vehicle body.

On the other hand, the mobile body 1 uses the tilt angular rate target value $\omega_{REF}$ that is continuous with respect to time, in addition to the velocity target value $V_{REF}$, as a control target, thereby suppressing a discontinuous change in tilt angular rate, that is, an abrupt change in tilt angular rate in a short time. The mobile body 1 can thereby smooth a change in the tilt angle of the vehicle body 11 which occurs during traveling while being an inverted pendulum type mobile unit in which the degree of manipulation of the control stick 13 by a user is associated with a velocity target value.

Figure 6:
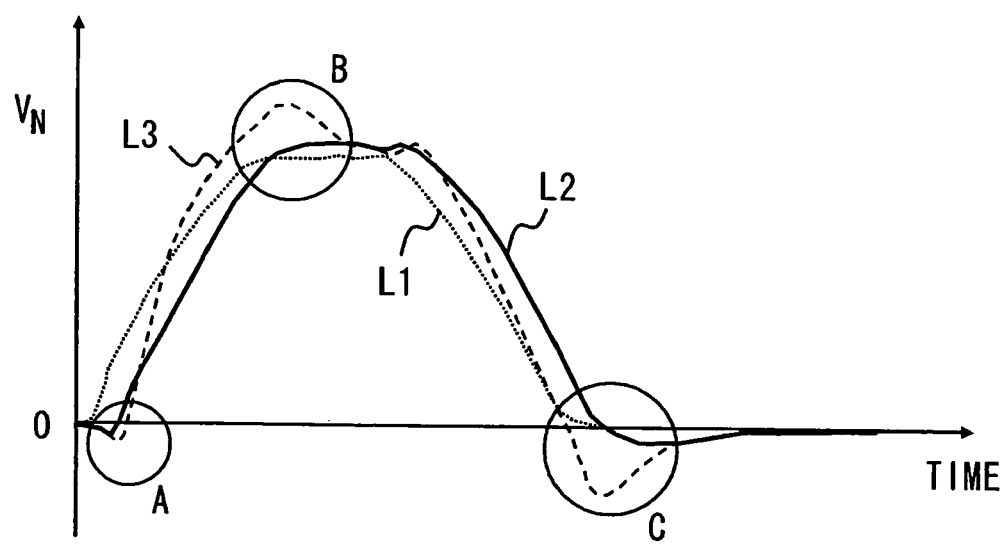
FIG. 6 A graph showing a translational velocity of an inverted pendulum type mobile unit according to an embodiment of the present invention.

FIG. 6 shows the relationship between a velocity signal (directed velocity) which is proportional to the degree of manipulation of the control stick 13 that is input by a user and the translational velocity $V_N$ of the mobile body 1. In FIG. 6, the dotted line L1 indicates a directed velocity, and the solid line L2 indicates the translational velocity $V_N$ of the mobile body 1. The dashed line L3 indicates the velocity of the mobile body which occurs when the directed velocity that is indicated by the dotted line L1 is used as it is as a velocity target value. Thus, the dashed line L3 shows the behavior of an inverted pendulum type mobile unit which performs velocity control according to a related art.

As shown in FIG. 6, the change in the velocity of the mobile unit according to a related art which is indicated by the dashed line L3 indicates "excessive behavior" with respect to the directed velocity L1 particularly in the zones surrounded by the circles A to C. On the other hand, the "excessive behavior" in the change in the velocity of the mobile unit according to a related art which is indicated by the dashed line L3 is suppressed in the change in the velocity of the mobile unit 1 which is indicated by the solid line L2.

In order for the mobile unit 1 to move forward according to a direction by a user, it is necessary to generate the acceleration in the forward direction of the mobile unit 1 after generating a positive tilt angle η. Thus, when starting the forward movement from the stopped state as shown in the circle A in FIG. 6, the positive tilt angle η is generated by temporarily generating a negative acceleration and a negative velocity to move the mobile unit 1 backward, and then a positive acceleration is generated to move the mobile unit 1 forward. In order to perform such control efficiently, it is desired to input the tilt angular rate target value $\omega_{REF}$, which is one of the velocity target value $V_{REF}$ and the tilt angular rate target value $\omega_{REF}$ that are generated based on the directed velocity that is input by the manipulation of the control stick 13, to the stabilization/traveling controller 107 precedently, and then input the velocity target value $V_{REF}$ to the stabilization/traveling controller 107 after a certain delay time. Therefore, in the target value generating portion 100 shown in FIGS. 2 and 3, the second-order integrator 102 is configured to have a larger delay than the multiplier 103, thereby generating a difference in output time between the velocity target value $V_{REF}$ and the tilt angular rate target value $\omega_{REF}$.

Figure 7:
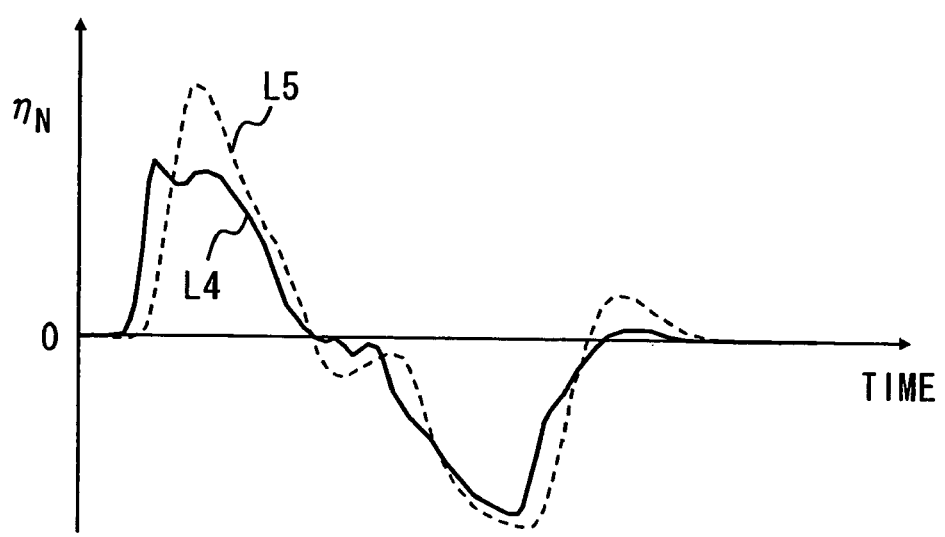
FIG. 7 A graph showing a translational acceleration of an inverted pendulum type mobile unit according to an embodiment of the present invention.

FIG. 7 shows the behavior of a tilt angle $\eta_N$ of the vehicle body 11 which is generated when the directed velocity that is indicated by the dotted line L1 in FIG. 6 is given to the mobile body 1. In FIG. 7, the solid line L4 indicates a change in the tilt angle $\eta_N$ of the vehicle body 11 with time. The dashed line L5 indicates a change in tilt angle with time when the same directed velocity is given to an inverted pendulum type mobile unit which performs velocity control according to a related art. As shown in FIG. 7, the degree of variation in tilt angle is smaller in the change in the tilt angle of the mobile body 1 which is indicated by the solid line L4 than in that of the related art which is indicated by the dashed line L5. Therefore, a change in the tilt angle of the vehicle body 11 is made smoothly in the mobile unit 1 of this embodiment.

Second Embodiment

The mobile body 1 according to the above-described first embodiment of the present invention performs the feedback control using the tilt angular rate target value $\omega_{REF}$ that is continuous with respect to time as an input value, thereby suppressing the accidental motion of the vehicle body 11 which is caused by a discontinuous change in tilt angular rate and achieving the smooth tilt motion of the vehicle body 11.

In order to further smooth the change in the tilt angle of the vehicle body 11, it is desired that a target value of a tilt angular acceleration that is a time derivative of a tilt angular rate target value is continuous with respect to time, that is, the tilt angular rate target value $\omega_{REF}$ is time-derivable, in addition to that the tilt angular rate target value $\omega_{REF}$ is continuous.

In order to assure that a target value of a tilt angular acceleration is continuous with respect to time, a velocity target value $V_{REF}$ that is capable of third-order derivative with respect to time may be generated. Specifically, the jerk generating portion 101 may be configured to generate a smoothly continuous jerk target value $J_{REF}$. Further, instead of the jerk generating portion 101, the target value generating portion 100 may be configured to generate a time derivative of a jerk that is continuous with respect to time based on a manipulation signal of the control stick 13, calculate a velocity target value $V_{REF}$ by performing third-order integration thereof, and further calculate a tilt angular rate target value $\omega_{REF}$ by performing first-order integration thereof and multiplying the result by the gain W1.

The configuration that is described in this embodiment further assures the continuity of a tilt angular acceleration, thereby enabling smooth acceleration and deceleration when tilting the vehicle body 11. It is thereby possible to further smooth the tilt motion of the vehicle body 11.

Other Embodiments

The first and second embodiments of the invention describe the configuration that determines the translational velocity target value $V_{REF}$ of the mobile unit 1 according to the degree of manipulation of the control stick 13 by a user. However a manipulated variable generating portion for determining the translational velocity target value $V_{REF}$ is not limited to the above-described control stick 13. For example, in a mobile unit which performs automatic traveling or unmanned traveling, a velocity target value which is pre-stored in a memory or the like may be read and input to the jerk generating portion 101. Alternatively, a velocity target value may be input to the mobile unit 1 from a remote place using a communication means.

Although the first and second embodiments of the invention describe specific examples in which the present invention is applied to an inverted pendulum type mobile unit which a person can board, the present invention may be applied to other mobile units. For example, it is applicable to a mobile unit which is incorporated into the lower body of a robot as a mobile mechanism of a humanoid robot, that is, a mobile unit in which the upper body of a humanoid robot is mounted on a vehicle body, or a mobile unit which moves with loads such as a baggage placed thereon.

Although the first and second embodiments of the invention use the encoders 17a and 17b for calculating the translational velocity $V_N$ of the mobile body 1, another velocity sensor may be used. Further, a sensor for measuring the tilt angular rate $\omega_N$ is not limited to the rate gyro 18. For example, a gravitational acceleration sensor, a suspended acceleration sensor or the like may be used.

Although the mobile unit 1 includes two wheels 10a and 10b as the at least one rotator in the first and second embodiments of the invention, the present invention may be applied, not limited to a mobile unit having such a configuration. For example, instead of wheels, a spherical rotator as disclosed in the patent document 1 may be used, or a columnar rotator may be used.

Although the velocity target value $V_{REF}$ is used as a target of the translational velocity of the mobile body 1 in the first and second embodiments of the invention, traveling control may be performed using another velocity corresponding to the translational velocity of the mobile body 1, such as a rotation angular velocity of the motors 15a and 15b or a rotation angular velocity of the wheels 10a and 10b, as a velocity target value.

Further, the present invention is not limited to the above-described embodiments but various changes may be made without departing from the scope of the invention.

INDUSTRIAL APPLICABILITY

The present invention is widely applicable to an inverted pendulum type mobile unit.

The invention claimed is:

1. A mobile unit including at least one rotator with a circular cross section and a vehicle body supported by the at least one rotator, the vehicle body capable of oscillating at least in a longitudinal direction of the mobile unit during traveling of the mobile unit, the mobile unit comprising:
   at least one motor driver to drive the at least one rotator;
   a target value generating portion to generate a velocity target value of the mobile unit and a tilt angular rate target value of the vehicle body in such a way that a second-order time derivative of the velocity target value is continuous and the tilt angular rate target value is continuous with respect to time; and
   a stabilization/traveling controller to calculate a control command value for the at least one motor driver using the velocity target value and the tilt angular rate target value as a control target so as to allow the mobile unit to travel at the velocity target value while maintaining a state where a center of gravity of the vehicle body or a center of gravity of a total mass of the vehicle body and a subject to be supported on the vehicle body is located above a rotation center of the at least one rotator.

2. The mobile unit according to claim 1, wherein the tilt angular rate target value is calculated by multiplying a second-order time derivative of the velocity target value by a predetermined gain.

3. The mobile unit according to claim 1, further comprising:

a manipulated variable generating portion to accept a manipulation input by a user and output a manipulated variable signal corresponding to a degree of manipulation by a user, wherein the target value generating portion generates the velocity target value and the tilt angular rate target value based on the manipulated variable signal.

4. The mobile unit according to claim 3, wherein the target value generating portion uses a correction signal obtained by correcting the manipulated variable signal in such a way that a second-order time derivative becomes continuous as the velocity target value.

5. The mobile unit according to claim 3, wherein the target value generating portion comprises:

a jerk generating portion to generate a second-order time derivative of the manipulated variable signal in such a way that the second-order derivative is continuous with respect to time; and a multiplier to multiply a second-order derivative generated by the jerk generating portion by a predetermined gain and output the tilt angular rate target value.

6. The mobile unit according to claim 5, wherein the target value generating portion further comprises:

a second-order integrator to perform second-order integration of a second-order derivative generated by the jerk generating portion and output the velocity target value.

7. The mobile unit according to claim 1, wherein the target value generating portion outputs a velocity target value generated based on the manipulated variable signal to the stabilization/traveling controller with a delay behind a tilt angular rate target value generated based on the manipulated variable signal.

8. The mobile unit according to claim 1, wherein the target value generating portion generates the velocity target value in such a way that a third-order time derivative is continuous and generates the tilt angular rate target value in such a way that a first-order derivative with respect to time is possible.

9. A method of controlling an inverted pendulum type mobile unit including at least one rotator with a circular cross section, and a vehicle body supported by the at least one rotator, and at least one motor driver to drive the at least one rotator comprising:

generating a velocity target value of the mobile unit and a tilt angular rate target value of the vehicle body in such a way that a second-order time derivative of the velocity target value is continuous and the tilt angular rate target value is continuous with respect to time; and performing a control loop comprising calculating a control command value for the at least one motor driver using the velocity target value and the tilt angular rate target value as a control target so as to allow the mobile unit to travel at the velocity target value while maintaining a state where a center of gravity of the vehicle body or a center of gravity of a total mass of the vehicle body and a subject to be supported on the vehicle body is located above a rotation center of the at least one rotator.

10. The method according to claim 9, wherein the tilt angular rate target value is obtained by multiplying a second-order time derivative of the velocity target value by a predetermined gain.

* * * * *